United States Patent [19]

Yamanaka et al.

[11] 4,272,669
[45] Jun. 9, 1981

[54] HEATER

[75] Inventors: Minoru Yamanaka, Ichikawa; Yukio Yamaya, Niiza; Masahide Ichikawa, Tokyo, all of Japan

[73] Assignee: Takeshi Yagi, Tokyo, Japan

[21] Appl. No.: 31,597

[22] Filed: Apr. 19, 1979

[30] Foreign Application Priority Data

Mar. 19, 1979 [JP] Japan .............................. 54-34289[U]

[51] Int. Cl.³ ............................................. A47J 37/08
[52] U.S. Cl. ........................................ 219/385; 99/419
[58] Field of Search ................ 219/523, 521, 354, 214, 219/242, 385; 99/419, 441

[56] References Cited

U.S. PATENT DOCUMENTS

| 1,583,500 | 5/1926 | Smith | 219/214 |
| 1,870,476 | 8/1932 | Babcock | 99/441 |
| 1,902,564 | 3/1933 | Mabey | 99/419 |
| 2,648,275 | 8/1953 | Thompson | 99/419 |
| 3,456,579 | 7/1969 | Woods | 219/214 |
| 3,635,146 | 1/1972 | Aubert | 99/419 |
| 3,965,808 | 6/1976 | Chomette | 99/419 |

FOREIGN PATENT DOCUMENTS 822286 10/1959 United Kingdom .................... 219/433

Primary Examiner—Richard R. Kucia
Assistant Examiner—Bernard Roskoski
Attorney, Agent, or Firm—Armstrong, Nikaido, Marmelstein & Kubovcik

[57] ABSTRACT

A heater comprising a heater proper, heating members erected at spaced locations on the heater proper and heat emitters enclosed one each in the heating members, whereby given raw foodstuffs are internally heated by having the heating members kept pierced in the foodstuffs.

5 Claims, 6 Drawing Figures

HEATER

BACKGROUND OF THE INVENTION

This invention relates to a heater to be used for warming of roasting thick cut pieces or masses of foodstuffs such as bread, ham, sausage and meat.

Heretofore, it has been the simplest, widespread practice to heat foodstuffs by keeping the foodstuffs on an iron plate or metal net supported on an electric hot plate or gas hot plate.

By heating with such a hot plate, however, it is difficult for a foodstuff to be evenly heated throughout its whole interior because the hot plate, by nature, applies heat substantially to the surface of the foodstuff, particularly the surface thereof looking toward the heat emitter of the hot plate. Use of the hot plate, accordingly, entails the disadvantage that thorough diffusion of heat in the foodstuff requires prolonged exposure of the food stuff to the heat and such prolonged exposure will possibly cause the foodstuff to be excessively browned on the surface frequently to the extent of being deprived of its characteristic flavor. Particularly, rolls of bread which are exclusively used for hot dogs and hamburgers are supplied as half baked and they are reheated immediately before insertion therein of cooked sausages and hamburger steaks. When these rolls are reheated with the hot plate which causes surface heating as described above, the heat does not easily penetrate and diffuse into the half-baked interior of the rolls, with the result that the rolls tend to sustain excessively browned surfaces which impair the appearance of the prepared food. When meat is heated with the hot plate, it tends to be roasted to hardness only in the surface portion or the juice retained therein tends to ooze out leaving behind flesh tissue destitute of the characteristic flavor of meat before the heat is sufficiently diffused evenly in the interior of the meat.

Recently gas ovens and electric ranges have found widespread utility in various applications. They, however, have the disadvantage that they are too large too expensive to be readily used for household applications, store sale activities, etc. Particularly in store sales such as of hot dogs and hamburgers, if bread and other items can be warmed, roasted or otherwise thermally treated in front of customers, such heating is advantageous in respect that it additionally produces demonstrative effects and advertising effects. These effects can hardly be attained by use of gas ovens and electric ranges.

SUMMARY OF THE INVENTION

The primary object of the present invention is to provide a heater which provides fast and uniform heating without excessively browning the surface of foodstuffs or impairing the characteristic flavor of foodstuffs. The second object of this invention is to provide a convenient heater which suits the store sales such as of hot dogs and hamburgers.

Other and further objects, features and advantages will become apparent more fully from the detailed description given herein below.

DETAILED DESCRIPTION OF THE INVENTION

Figure 1:
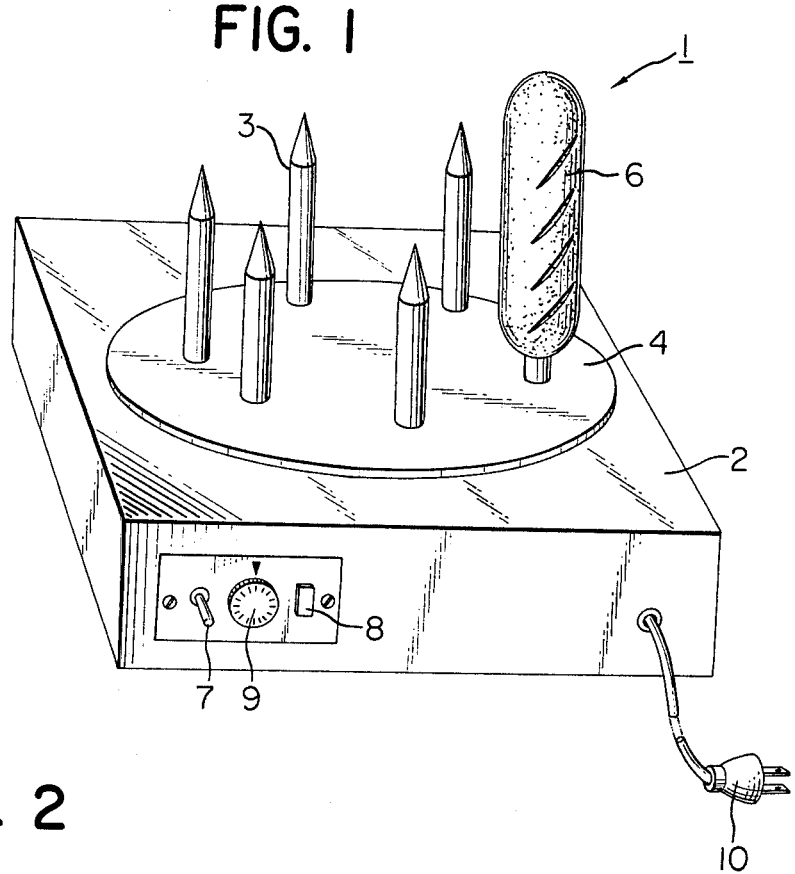
FIG. 1 is a perspective view of one preferred embodiment of the heater of the present invention.

As illustrated in FIG. 1, this heater 1 comprises a heater proper 2 containing a necessary electric circuit and a plurality of heating members 3 erected at spaced locations on the heater proper 2.

Figure 2:
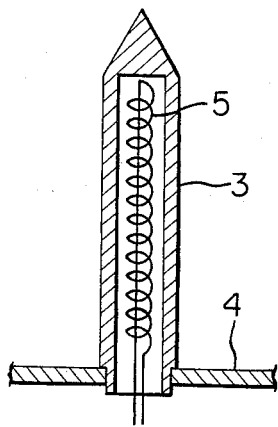
FIG. 2 is a longitudinally sectioned view of the heater member.

The heating member 3 is a round bar made of aluminum, copper iron or an alloy thereof which has high thermal conductivity. It is shaped specially to suit the heating of slender foodstuffs such as rolls of bread for hot dogs and sausages. The lower end of this heating member 3 is screwed fast into a fitting plate 4 which is disposed on the upper surface of the heater proper 2 as illustrated in FIG. 2. The heating member 3 has a hollow interior for accommodating a built-in heat emitter 5. The free end of the heating member 3 is desired to be pointed as illustrated so as to be easily pierced into the foodstuff.

Figure 3:
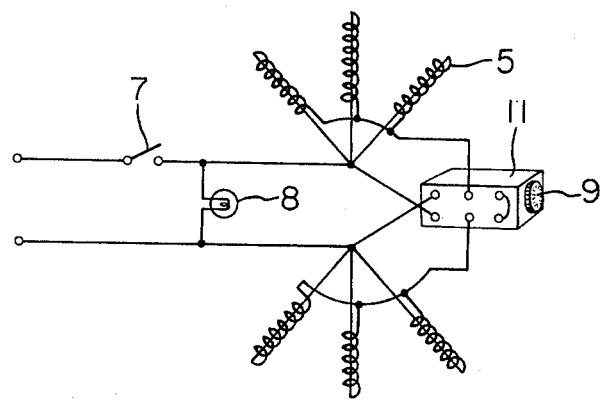
FIG. 3 is a diagram of one typical electric circuit used in the heater shown in FIG. 1.

On the front side of the heater proper 2, there are disposed a main switch 7 used to close or open a circuit between the heat emitter 5 and the power source, a display lamp 8 adapted to glow to indicate that the main switch 7 is in the ON, status, a temperature adjusting knob 9 used to adjust the amount of heat generated by the heat emitter 5 and a plug 10 for the power source connection of the heater 1. As illustrated in FIG. 3, the heat emitters 5 are connected in series to the power source via the main switch 7 and a thermostat 11. As the main switch 7 is turned on, the display lamp 8 is lit up and, at the same time, the flow of electric current is forwarded to the heat emitters 5. The thermostat 11 serves to regulate the electric current flowing to the heat emitters 5 and consequently retain the temperature of the heating members 3 at the level selected by the temperature adjusting knob 9. The thermostat 11 may be of the type using a bimetal or of any of the types generally adopted today for the purpose. Although this thermostat 11 may be only capable of retaining the temperature of the heating members 3 at a fixed level, it is more advantageous to be capable of allowing the temperature of the heating members 3 to be retained at a selected level as described above.

The present heater 1 causes footstuffs 6 which are skewered by the heating members 3 to be heated with the heat issuing from the heat emitters 5. Since the heat emanating from the entire circumference of each heating member 3 located at the center of the foodstuffs 6 is applied to the foodstuffs, the foodstuffs 6 can be quicky and uniformly heated. Since the foodstuffs 6 are heated outwardly from their center, the heating has no possibility of excessively browning their surface to the extent of impairing their appearance. Particularly in the case of rolls of bread used exclusively for preparation of hot dogs and hamburgers, the heating provided by the heater of the present invention is advantageous in that the heating is given outwardly from the center at which the rolls are half-baked. In the case of cut pieces of meat, this heating proves advantageous in that the characteristic flavor of meat is not lost because the amount of meat juice suffered to ooze out during the heating is much smaller. Further, the fact that foodstuffs 6 are heated as skewered by the heating members 3 and consequently retained in an erect position has the advantage that the quantity of foodstuffs 6 which can be simultaneously cooked can be increased by increasing the number of heating members 3 provided on the heater 1 despite the relatively small size of the heater. Once the foodstuffs 6 are set on the heating members 3, they need not be touched until they have undergone thorough heating. Thus, the heater is rarely limited by the selection of a place for its installation. In the case of store sale such as of hot dogs and hambergers, for example, this heater 1 may be installed at a position conspicuous to customers, so that the use of the heater serves an additional purpose of producing demonstrative and advertising effects. Since the heater has a very simple structure, it is priced much lower and handled with greater ease than gas ovens and electric ranges.

For the heating member 3 to be pierced through foodstuffs with ease, the foodstuffs may be perforated in advance. When the heating member 3 has a sufficiently sharp pointed end, it may be directly pierced through the foodstuffs without requiring any such preparatory perforation. Especially when rolls of bread for hot dogs have been skewered by the heating member 3 of the shape of a round bar, the holes left behind in the baked rolls of bread owing to the insertion of the heating member 3 may be conveniently used for insertion of sausage and other condiments.

Figure 4:
FIG. 4 is a perspective view of another shape of the heater member.
Figure 6:
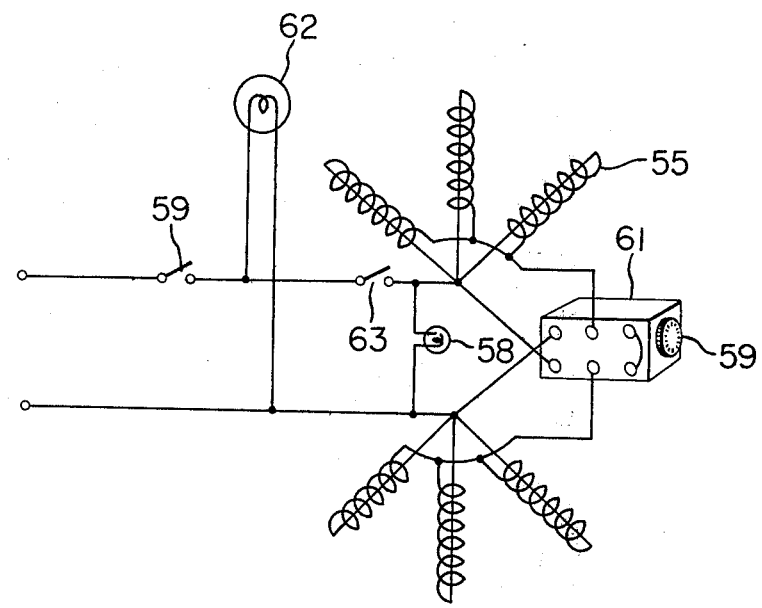
FIG. 6 is a diagram showing one typical example of the electric circuit of the heater of FIG. 5.

FIG. 4 illustrates the heating member in another shape. To be specific, the heating member has the shape of a plate so as to suit the heating of thick sliced pieces of bread for wrapping hamburger steaks and thick slices of meat. In this case, the free end of the plate-shaped heating member is desired to be thinned enough to permit easy insertion into foodstuffs. The question as to whether the heating member 3 is to be designed in the shape of a round bar or a plate may suitably be determined in conformity with the shape of foodstuffs to be cooked with the heater.

Figure 5:
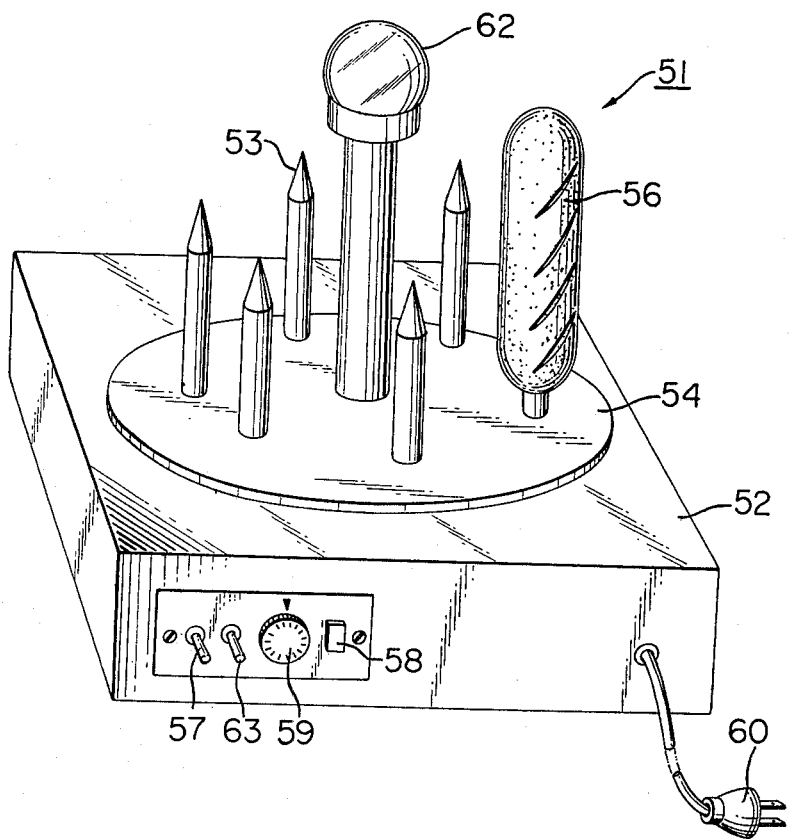
FIG. 5 is a perspective view of another preferred embodiment of the heater of the present invention.

The heater 51 illustrated in FIG. 5 has substantially the same construction as the heater illustrated in FIG. 1, except that a warming lamp 62 is disposed at the center of the fitting plate 54 and a sub-switch 63 adapted to close or open the path of electric current to the heat emitters 55 without affecting the operation of the warming lamp 62 is disposed on the front side of the heater proper 52. As is apparent from FIG. 5, the heat emitters 55 are connected in series to the power source via the main switch 57, the sub-switch 63 and the thermostat 61, while the warming lamp 62 is parallelly connected between the main switch 57 and the sub-switch 63 and the display lamp 58 between the sub-switch 63 and the heat emitters 55.

The warming lamp 62 does not emit heat so intensely as to brown the foodstuffs 56 set on the heating members. Instead it applies heat externally to the foodstuffs 56 skewered by the heating members 53 and aids in promoting the heating of foodstuffs. When the heater is used for store sale, the warming lamp 62 attracts customers' attention and enhances the demonstrative and advertising effects. After the foodstuffs 56 have been thoroughly heated, the warming lamp 62 prevents the heated foodstuffs from being cooled off even when the sub-switch 63 is turned off. This retention of the heated foodstuffs at the elevated temperature is accomplished all the more effectively by keeping the heater 51 wholly in a transparent plastic or glass case. Denoted by 59 and 60 are the temperature adjusting knob and the plug respectively.

As described above, the heater according to the present invention provides uniform, quick heating of foodstuffs without browning the surface of foodstuffs or depriving the foodstuffs of their characteristic flavor. It can conveniently be used in general household applications or for store sale of cooked foodstuffs. Thus, the present invention contributes greatly to the heating of foodstuffs.

What is claimed is:

1. A heating apparatus for heating foodstuffs, said heating apparatus comprising:
   (a) a housing;
   (b) a plurality of heating means mounted in a circular pattern on said housing, each of said heating means comprising a hollow means for insertion into said foodstuff and an electric heating element positioned within the hollow portion of said hollow means, wherein said heating means heats the foodstuff inserted thereon from the inside;
   (c) warming lamp means mounted on said housing at the center of the circular pattern of said heating means, said warming lamp means warming the foodstuff from the outside and producing light for the attracting the attention of a purchaser; and
   (d) control means mounted in said housing and connected to said heating means and said warming lamp means for controlling the operation thereof wherein in one mode said heating means and said lamp means are on and in another mode, said heating means is off and said lamp means is on.

2. A heating apparatus as set forth in claim 1, wherein said hollow means is cylindrical.

3. A heating apparatus as set forth in claim 1, wherein said hollow means is bade shaped.

4. A heating apparatus as set forth in any one of claims 1-3, wherein said hollow means has a sharp pointed end.

5. A heating apparatus as set forth in claim 1, wherein said control means includes a thermostat for controlling the temperature of said heating means.

* * * * *